Sept. 21, 1943.  N. S. MARTIN ET AL  2,330,132
COMBINED ROTISSERIE, OVEN, AND BROILER
Filed Oct. 30, 1940  4 Sheets-Sheet 4

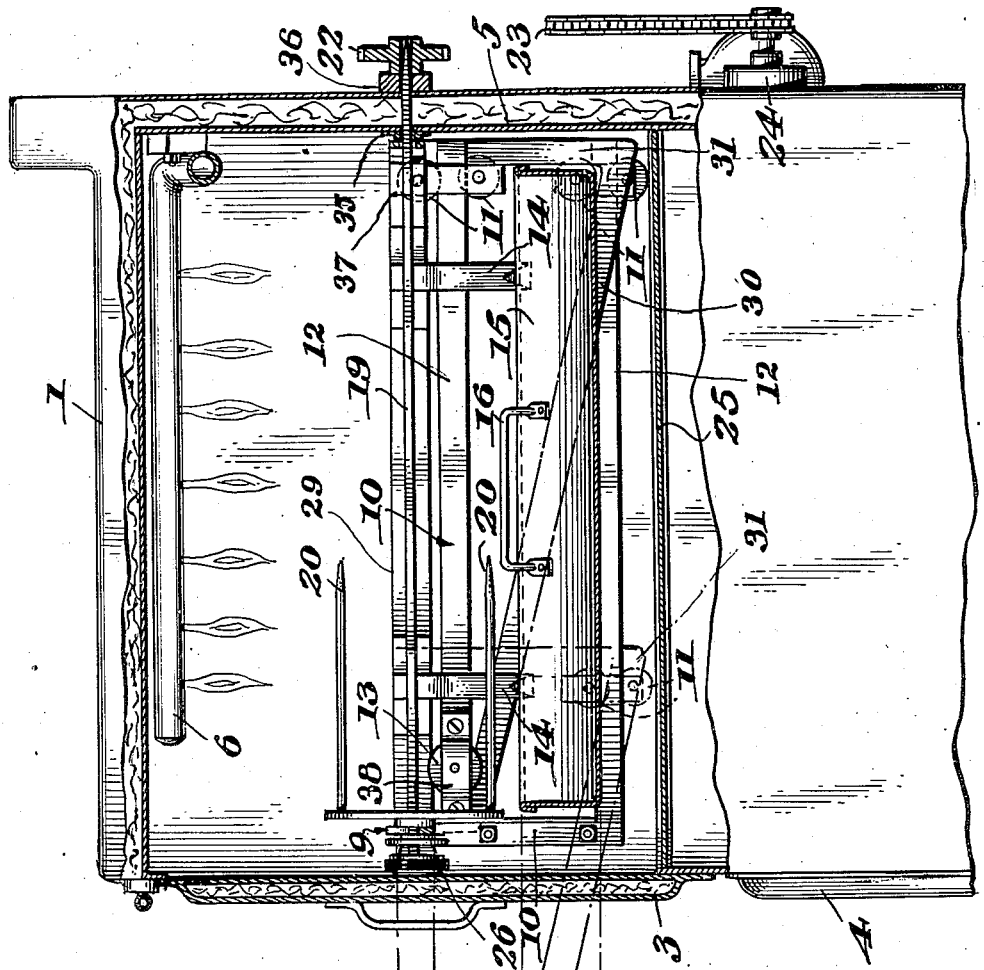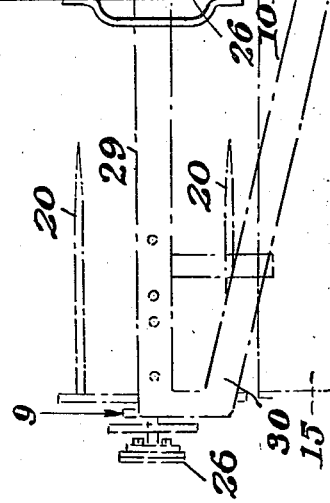

Patented Sept. 21, 1943

2,330,132

UNITED STATES PATENT OFFICE 2,330,132

COMBINED ROTISSERIE, OVEN, AND BROILER

Nicholas S. Martin and Henry Leon, Brooklyn, N. Y.

Application October 30, 1940, Serial No. 363,574

2 Claims. (Cl. 126—41)

This invention relates to improvements in a combined rotisserie, oven and broiler, and more particularly to such a device which will include a horizontally slidable rack positioned within the casing of the device, which will support the rotisserie spit, and which may be readily withdrawn from the casing or oven for purposes of inspecting the fowl or meat being cooked, or for basting purposes.

An object of our invention is to provide a combined rotisserie, oven and broiler which will be suitably insulated for storing heat within the same, and which will be provided with a horizontally slidable rack adapted to be housed within the oven and to adjustably support a rotatable fowl or meat supporting spit adjacent to a heating flame, and to further support an interchangeable drip pan or grate, for purposes hereinafter described.

Another object of our invention is to provide an improved rotisserie, oven and broiler having upper and lower heating elements which will be arranged so that the rotisserie cooking and baking may be done in the upper portion of the oven, while the lower portion of the oven will be set aside for broiling purposes.

A still further object of our invention is to provide a combined rotisserie, oven and broiler which will include a heat insulated casing or housing in which a horizontally slidable rack is adapted to be positioned, and said rack supports a rotatable rotisserie spit and a skewer upon which sausage or other small pieces of meat may be supported while being cooked, said rack being adapted to be withdrawn from the casing or housing while being restrained to slide in a single horizontal plane for purposes of inspection or for basting the fowl or meat, and means further associated with said rotatable spit located exteriorly of said casing or housing for causing the rotation of the spit.

Another object of this invention is to provide a horizontally slidable rack which is at all times rigidly and non-rotatably supported at opposite sides of the rack so that the user will have both hands free for removal or inspection of the article being cooked.

Other objects will appear as the description proceeds.

In the accompanying drawings which form a part of our application,

Fig. 3 is a longitudinal view partly in section of our rotisserie, oven and broiler showing in dotted lines, the rotisserie rack withdrawn from the oven or cabinet;

Like characters of reference are used throughout the following specification and the accompanying drawings to designate corresponding parts.

Figure 1:
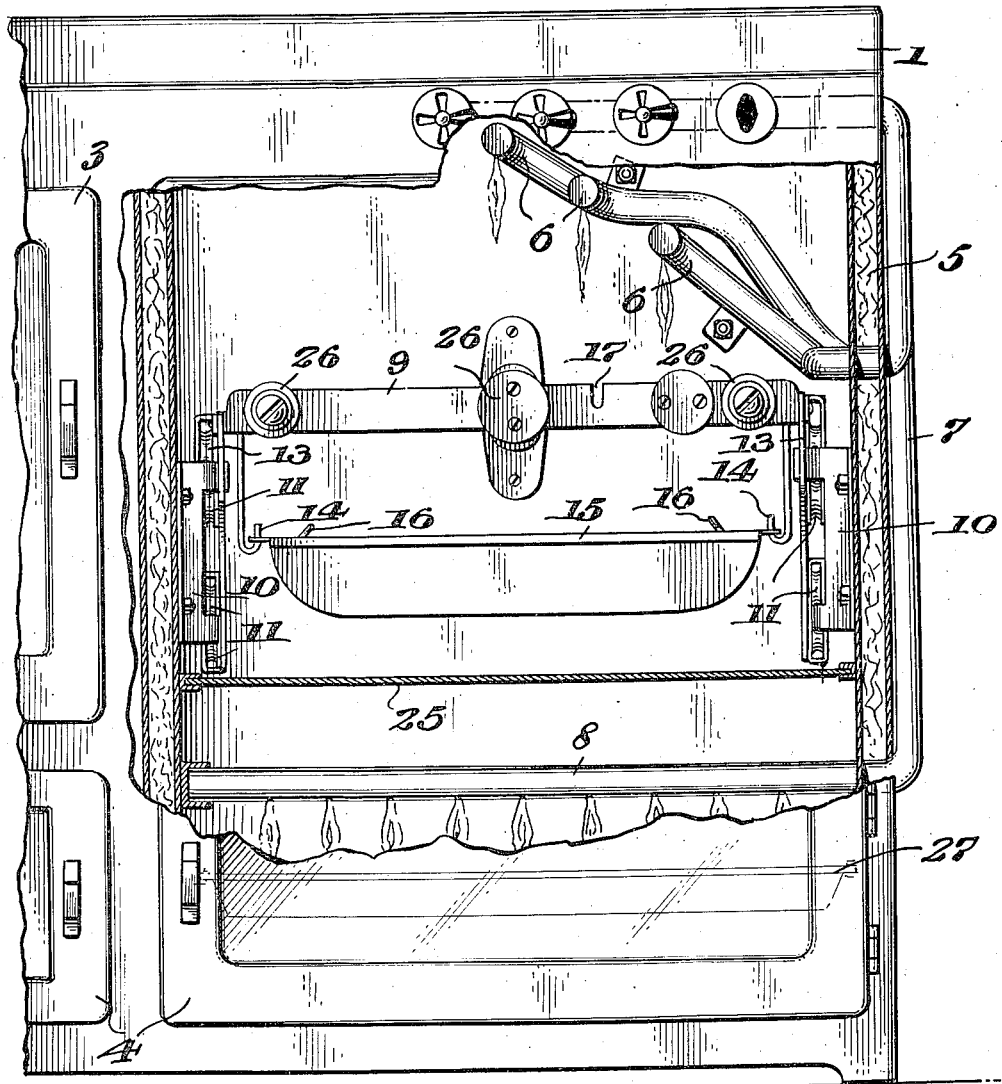
Fig. 1 is a front elevation of our improved rotisserie, oven and broiler showing the same partially broken away to more clearly illustrate the position of the withdrawable rotisserie rack.

In carrying out our invention, we provide a combined rotisserie, oven and broiler having a casing or housing 1 which will be suitably supported upon the legs 2 and will be provided at its front end with the oven door 3 and the broiler door 4 positioned below the said oven door.

As clearly illustrated in the drawings the walls of the oven and the doors for the same will be suitably insulated by means of the insulation 5 positioned between the spaced walls. A suitable source of heating energy will be provided in the form of the gas burners 6 arranged at an angle adjacent the top of the oven 1 and within the same, and the branch pipe 7 will also convey the gas to a gas burner 8 located adjacent the upper portion of the broiler in the casing or housing 1. From the illustrations as shown in the several figures, it will be apparent that the flames from the several gas burners will be directed downwardly.

Figure 5:
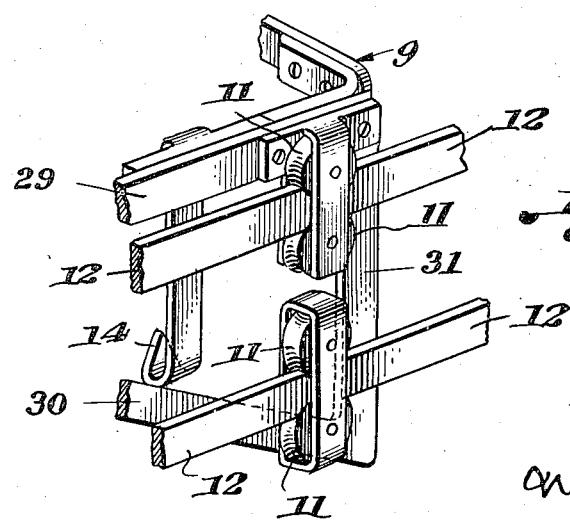
Fig. 5 is an enlarged detail view in perspective of the rear end mounting of one side of the rotisserie rack.

The main feature of our invention is the provision of a slidable rack 9 supported horizontally at the opposite sides of the casing or housing 1 within the oven by means of the framework 10 secured to the said side walls of the oven. The rack 9 is provided at its rear end with the spaced pairs of supporting rollers 11, as clearly illustrated in Fig. 5 of the drawings, said rollers in turn riding on the spaced upper and lower rails 12 forming the side elements of the framework 10. At the forward end of the rack 9, there are antifriction rollers 13 mounted on the upper side rails 12 and adapted to contact and bear against the under surfaces of the upper longitudinal members 29, thus permitting the rack to be readily withdrawn from the oven, or to be pushed into same with the least amount of effort and to remain rigid at all times.

Supported upon the opposite longitudinal side members of the rack 9 are depending hook supports 14 which are used to interchangeably support a drip pan 15 having the handles 16, or a grate (not shown) when it is desired to remove the drip pan and to substitute a baking pan with a roast or other food when the same is to be baked within the oven.

Figure 2:
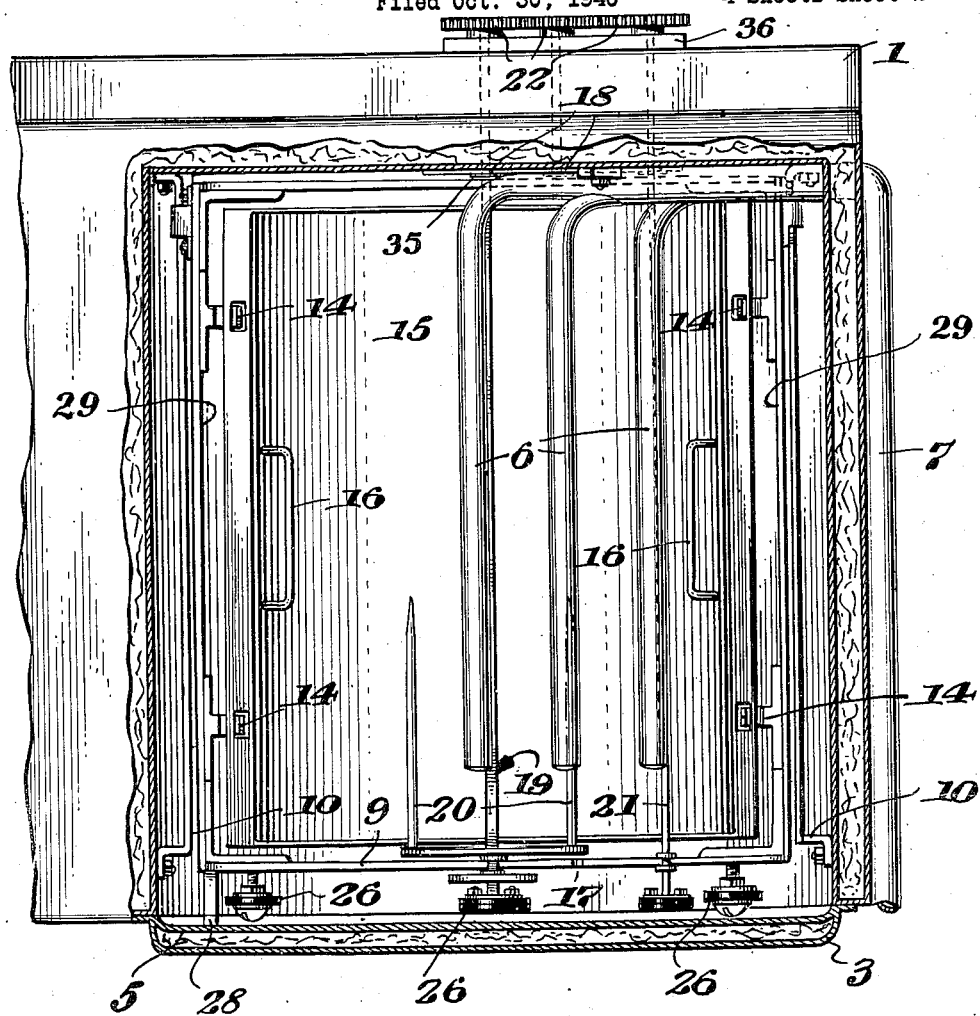
Fig. 2 is a plan view of our rotisserie, oven and broiler with the top broken away to show the position of the several cooperating parts.

As shown in Figures 1 and 2, the forward horizontal member of the rack 9 has notches 17. As shown in Figure 2, the rear horizontal member of the rack 9 has openings 18. These notches and openings serve for the reception of the spit 19 and rod 21. The spit 19 carries skewer elements 20 in such a manner that the said spit may be rotated with respect to the gas burners for faster cooking or to accommodate fowl or pieces of meat of varying size. A second rotatable rod or bar 21 will be positioned through the front and rear rails of the rack 9, and will be adapted to pierce and support sausages or small pieces of meat for cooking while being rotated. The rear ends of the spit 19 and the rod 21 extend through the rear wall of the casing or housing 1 and engage the train of gears 22 which will be intermeshed, the same being driven by the sprocket chain 23 and the electric motor 24 supported at the rear of the said casing or housing. From the foregoing description it will be apparent that when the electric motor 24 is energized and operated, the rotisserie spit and rod will be rotated through the medium of the sprocket chain and gear train. In passing it will of course be obvious that the gas burners may be eliminated and electrical heating elements may be substituted in lieu thereof.

Figure 4:
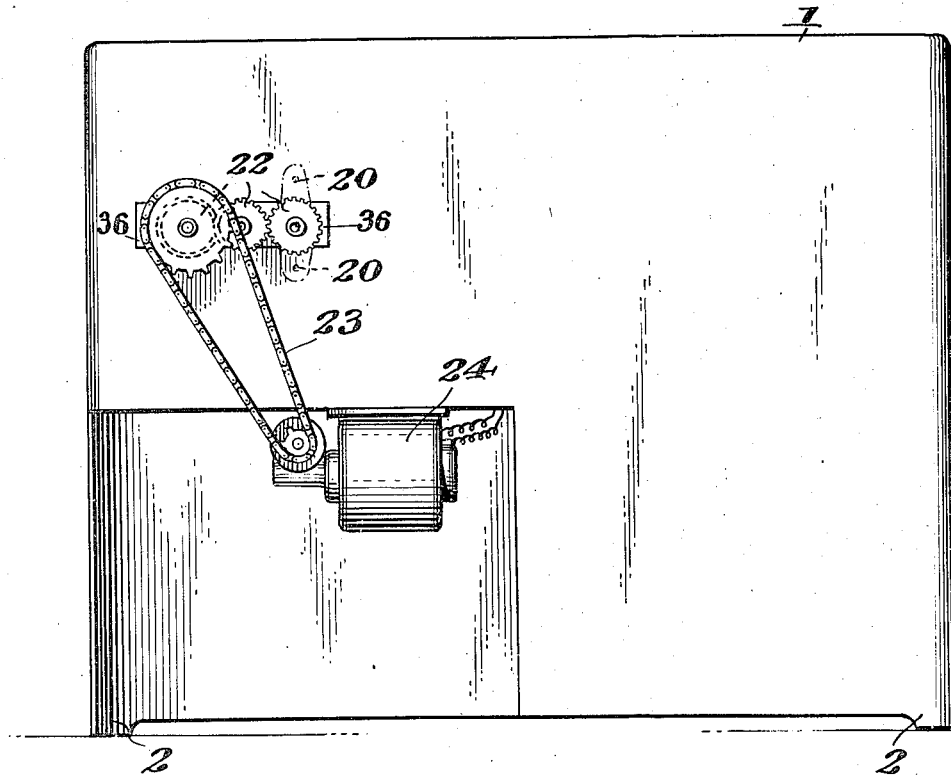
Fig. 4 is a rear elevation of our improved rotisserie, oven and broiler showing the gear and motor mechanism for operating the rotisserie spit.

As shown in Figures 2 and 4, it will be seen that the intermeshing gears are positioned with their centers in a single horizontal plane. It will also be seen in Figure 2, that the spit 19 and the rod 21 extend through the rear wall of the casing into engagement with two of said gears. The spit 19 and the rod 21 are thus mounted to be rotated simultaneously.

As best shown in Figure 3, it will be seen that the rear wall of the casing provides passage therethrough for the spit 19 and that the spit is sufficiently long to pass through an opening in said rear wall and into engagement within an axially positioned through aperture in one of the gears 22.

A partition plate 25 is slidably received between the opposite walls of the oven 1 so that it will separate the oven proper from the lower broiler portion of the casing.

Suitable handles 26 of heat insulated material are mounted upon the forward rail of the rack 9 so that when the door 3 of the oven is open the same may be grasped and the rack withdrawn from the oven for the inspection of the fowl or meat being cooked or for basting purposes.

Positioned within the broiler portion of the casing or housing 1 is a removable pan 27 upon which steaks or other meats may be placed for broiling. It will be obvious that the operation of the rotisserie and oven will be entirely separate from the operation of the broiler, and each may be used whenever desired independently of the other, or at the same time.

As heretofore mentioned, the main feature of our invention is the provision of the slidable rack mounted within the oven and arranged for the outward movement and support of the rotatable rotisserie spit, together with the interchangeable drip pan 15 and the grate (not shown) when it is desired to use the oven for baking where fowl or meat to be baked is placed within a pan and supported upon the said grate.

A suitable latch 28 attached to the oven will be adapted to engage the forward rail of the rack 9 to hold the same within the oven in fixed position.

As best shown in extended position in Figure 3, it will be seen that during the outward movement of the rack 9, the housing 37 of the upper rollers 11 comes into contact with the housing 38 of the roller 13 and this limits the outward movement of the rack, spit and pan from the casing. This arrangement prevents accidental detachment of the rack from the oven.

It is to be noted that the rack 9 has vertical cantilever sides, best shown in Figure 3, the said sides being skeleton shaped and respectively comprising a horizontal upper longitudinal member 29, an inclined lower longitudinal member 30 and a rear vertical member 31. The cantilever beams form sides which are designed to reinforce and support the rack 9 and prevent it from bending out of its normal horizontal plane.

It will be apparent that we have provided a highly efficient form of combined rotisserie, oven and broiler which will be relatively inexpensive to manufacture and operate, and which may be used equally well with gas for heating or with electrical heating elements.

As best shown in Figure 3, it will be seen that a flange 35 is provided which faces the interior of the casing 1. It will also be seen in Figures 2 and 3, that a rectangular plate 36 is provided at the exterior of and contacting with the casing 1. It is also to be noted in the cross-sectional view in Figure 3, that the spit 19 passes completely through the rear wall of the casing and through the plate 36 and finally through the central portion of one of the gears 22.

Many minor changes in detail of construction may be resorted to without departure from the spirit of the invention.

Having thus described our invention what we claim as new and desire to secure by Letters Patent of the United States, is:

1. In a combined rotisserie oven and broiler of the class described, comprising a casing having a door in its front wall, upper and lower guide rails secured in vertically spaced relation at opposite sides of said casing, a rack positioned in a horizontal plane within said casing and having means for rotatably supporting spit and rod means in said plane, a drip pan supported from said rack, said rack having vertical cantilever sides comprising upper and lower longitudinal members and a vertical rear member, said rack having roller means in engagement with the lower faces of said upper and lower guide rails, rollers mounted on said upper guide rails at the end adjacent said door and in engagement with the lower faces of said upper longitudinal members, said rack, spit, and pan being jointly slidable horizontally into and out of said casing and being maintained by said rollers in said horizontal plane whereby when said rack is in its outermost position, said spit remains supported in said horizontal plane for inspection of the article being roasted and said pan remains in horizontal position to catch drippings from said roasted article, means for limiting the outward movement of said rack from said casing, and a plurality of gears mounted on the rear wall of said casing with their axes lying in said horizontal plane, the rear wall of said casing having apertures therethrough for said spit and rod means, said gears having through axial apertures in alinement with said apertures in said rear wall of said casing and being adapted to engage said spit and rod means for simultaneous rotation thereby when said rack is moved inwardly to the rear wall of said casing.

2. In a rotisserie of the class described, a casing having rails on opposite side walls and a plurality of axially apertured gears mounted on the rear wall of said casing with said apertures positioned in a horizontal plane, said rear wall having apertures in alinement with said gear apertures, a rack mounted on said rails for movement into and out of said casing, said rack having means for supporting spit and rod means in alinement with said gear apertures, said rack having integral cantilever beams longitudinally positioned at opposite sides thereof, said beams having rollers mounted thereon and being in rolling engagement with said casing rails, said beams forming side frames adapted to reinforce said rack and maintain said spit and rod means in alinement with said gears for rotation thereby when said rack is moved inwardly to the rear wall of said casing.

NICHOLAS S. MARTIN.
HENRY LEON.